United States Patent [19]

Enzu

[11] Patent Number: 5,676,509

[45] Date of Patent: Oct. 14, 1997

[54] FASTENING PAD

[75] Inventor: Masao Enzu, Shizuoka, Japan

[73] Assignee: S. P. Chemical Co., Ltd., Shizuoka-ken, Japan

[21] Appl. No.: 551,730

[22] Filed: Nov. 1, 1995

[30] Foreign Application Priority Data

Feb. 22, 1995 [JP] Japan .................. 7-072231

[51] Int. Cl.$^6$ .................................. B60P 7/16
[52] U.S. Cl. .................. 410/119; 410/117; 410/125; 206/522
[58] Field of Search .................. 410/117, 118, 410/119, 121, 125, 155; 267/140.3, 139, 140.4, 83, 84; 206/522, 523, 591, 592, 593

[56] References Cited

U.S. PATENT DOCUMENTS

| 2,907,580 | 10/1959 | Tietig | 410/119 |
|---|---|---|---|
| 3,380,577 | 4/1968 | Washburn | 206/522 X |
| 3,514,157 | 5/1970 | Geiser | 206/522 X |
| 3,667,625 | 6/1972 | Lucas | 410/119 |
| 3,675,377 | 7/1972 | Suter | 206/522 X |
| 3,768,724 | 10/1973 | Hill | 206/591 X |
| 3,987,736 | 10/1976 | Miller | 410/119 |
| 4,572,716 | 2/1986 | West | 410/119 X |
| 4,709,817 | 12/1987 | Keady et al. | 206/592 X |
| 4,854,792 | 8/1989 | Cottone | 410/118 |
| 5,397,000 | 3/1995 | Holte et al. | 206/522 X |

FOREIGN PATENT DOCUMENTS

| 2720057 | 11/1978 | Germany | 410/119 |
|---|---|---|---|
| 55-91434 | 7/1980 | Japan | 410/125 |

Primary Examiner—Karen B. Merritt
Assistant Examiner—Stephen Gordon
Attorney, Agent, or Firm—Beveridge, DeGrandi, Weilacher & Young LLP

[57] ABSTRACT

A fastening pad (1) is attachably and detachably inserted into an accommodating furniture (2) to temporarily secure stored goods (3) in the furniture as they are. The fastening pad (1) comprises: a flat sealed bag (11) made of a flexible synthetic resin film; at least one vent valve (12) secured to the sealed bag (11); and a flat absorbing member (13) attached on one side of the sealed bag (11) and made of a flexible recoverable foamed material. The sealed bag (11) is expanded to temporarily secure the stored goods (3) in the accommodating furniture (2) when air is supplied to the sealed bag (11) through the vent valve (12).

17 Claims, 6 Drawing Sheets

FASTENING PAD

BACKGROUND OF THE INVENTION (1) Field of the Invention

This invention relates to a fastening pad which is detachably inserted into furniture to temporarily secure goods stored in the furniture as they are.

(2) Statement of the Prior Art

Heretofore, in the case of removal or the like, goods such as dinner sets, documents, books, files, clothes and the like stored in accommodating furnitures such as cupboard, bookshelf, wardrobe, and the like are once taken out of the furniture, wrapped with suitable sheets or papers, and packed into the original furnitures or another furnitures. After finishing the removal, steps reversed in the above are carried out.

These steps require much time and labor in taking the goods out of the furniture, wrapping them, taking them into casings, packing the casing, unpacking the casings, taking the goods into the furnitures, and the like. Further, these steps need additional wrapping and packing materials.

In order to eliminate such steps, it has been proposed to secure the goods stored in the furniture as they are by inserting absorbers into the furniture.

However, such absorbers are bulky and troublesome in disposal after use. Use of air pads has been tried instead of a part of the absorbers. The air pads, however, repeat expansion and contraction of themselves in response to a change in an atmospheric temperature. The expansion of the air pads may break the furniture or goods while their contraction may lower a fastening pressure for the goods, thereby permitting the goods to move in the furniture. This will result in breakage of goods. Accordingly, the air pads can be used only in a limited condition.

SUMMARY OF THE INVENTION

An object of the present invention is to provide a fastening pad which can secure stored goods in an accommodating furniture as they are in order to make transportation of the furniture convenient and to save a trouble of packing the goods and rearranging the goods in the furniture.

Another object of the present invention is to provide a fastening pad which can secure stored goods in an accommodating furniture as they are so that the fastening pad is not subjected to an influence of change in an atmospheric temperature in the case of keeping the stored goods in the furniture for a long term or transporting the furniture to a remote place.

In order to achieve the above objects, a fastening pad of the present invention is attachably and detachably inserted into an accommodating furniture to temporarily secure stored goods in the furniture as they are. The fastening pad comprises: a flat sealed bag made of a flexible synthetic resin film; at least one vent valve secured to the sealed bag; and a flat absorbing member attached to one side of the sealed bag and made of a flexible recoverable foamed material. The sealed bag is expanded to temporarily secure the stored goods in the accommodating furniture when air is supplied to the sealed bag through the vent valve.

The absorbing member may be attached to both sides of the sealed bag.

The absorbing member may be provided in the outer face with a plurality of slits which are spaced away by a given distance in a longitudinal direction.

An expandable filling member may be packed in the sealed bag in a vacuum condition. Air is sucked in the sealed bag when the vent valve is opened in use.

The filling member may be made of an expandable porous material. The filling member may be a plurality of compression springs which are disposed in parallel with each other in the sealed bag.

The absorbing member may be covered with a flexible sheet having a plurality of air vents.

In the fastening pad of the present invention, the absorbing member attached to the sealed bag, which is made of the flexible and recoverable material can absorb and supplement the expansion and contraction of the sealed bag, since the sealed bag filled with air expands and contracts due to a change in temperature and the expansion of the bag may break the furniture while the contraction of the bag may so lower the fastening pressure that the stored goods may jump out of the furniture or may be broken.

Expansion and contraction rate of air filled in the sealed bag is 0.332% in volume per 1° C. of temperature rose and fall when 20° C. in atmospheric temperature and 1 at atmospheric pressure set as a reference standard, in accordance with an experiment. In consideration of the most servere condition of transportation during the summer and winter seasons, if an atmospheric temperature and a container temperature in summer are at 30° C. and 60° C., respectively, the expansion rate will be 9.96% and if a loading temperature and an unloading temperature are at 15° C. and −20° C., respectively, the contraction rate will be 11.62%. If the absorbing member has a thickness enough to absorb the expansion and contraction at a rate of 15% to make allowance therefor, the absorbing member can absorb and supplement the expansion and contraction values due to temperature change under the above condition.

It is possible to grasp the stored goods in uneven heights by filling the expandable and recoverable filling member into the sealed bag under a vacuum condition, attaching the flexible and recoverable absorbing member to the exterior of the sealed bag and providing a plurality of slits in the absorbing member in a depth extending from the lower side of the member to a half of thickness thereof. The absorbing member without the slits cannot grasp the goods arranged at uneven heights in the furniture.

It is possible to easily insert the fastening pad with the absorbing member between the stored goods and the ceiling board of the accommodating furniture, since the expandable and recoverable filling member can be compressed under vacuum in a thickness of 15% or less of thickness under atmospheric pressure. When the vent valve provided in the sealed bag is opened to introduce air into the sealed bag, the sealed bag pushes down the absorbing member made of a porous material. Since the slits extend to a half of thickness of the absorbing member, the slits can ensure to grasp the goods in spite of uneven heights of the goods. If the stored goods have even heights and the absorbing member is not provided on the pad and only the filling member is provided in the pad, the filling member will contact with the goods directly. Such sealed bag will not be preferable, since the goods are accompanied with the pad when the pad is taken out of the furniture. Thus, the layered absorbing member becomes essential to the pad. When the fastening pad of the present invention is taken out of the furniture after transporting, it is possible to take the pad out of the furniture by inserting a hand between the stored goods and the absorbing member while compressing the absorbing member and filling member, since the absorbing member contacts with the stored goods.

In the case that the fastening pad is covered by air-filled sealed bag and flexible and recoverable absorbing member is covered by sheet with air vents, air is to be filled in the sealed bag in an amount enough to compress the absorbing member into a half of its thickness. Since the absorbing member is communicated with the atmospheric pressure through the air vents in the sheet, air in the absorbing member will exhaust outside for compression by the amount equivalent to the expanded volume of air in the sealed bag. When the air in the sealed bag is contracted by a fall in the atmospheric temperature, external air is drawn in through the air vents in the sheet by the recovery action of the absorbing member. This repetition of exhaustion and suction of air can maintain the fastening pressure in the pad constant regardless of the expansion and contraction of air in the sealed bag.

DETAILED DESCRIPTION OF THE PREFERRED EMBODIMENTS

Referring now to FIGS. 1 to 20, embodiments of a fastening pad in accordance with the present invention will be explained below.

[First Embodiment]

Figure 1:
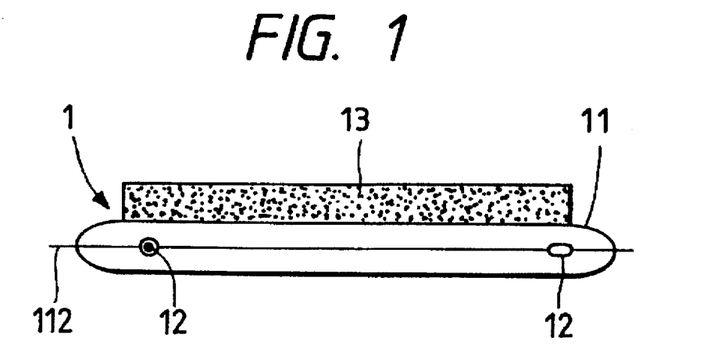
FIG. 1 is a side elevational view of a first embodiment of a fastening pad in accordance with the present invention.
Figure 2:
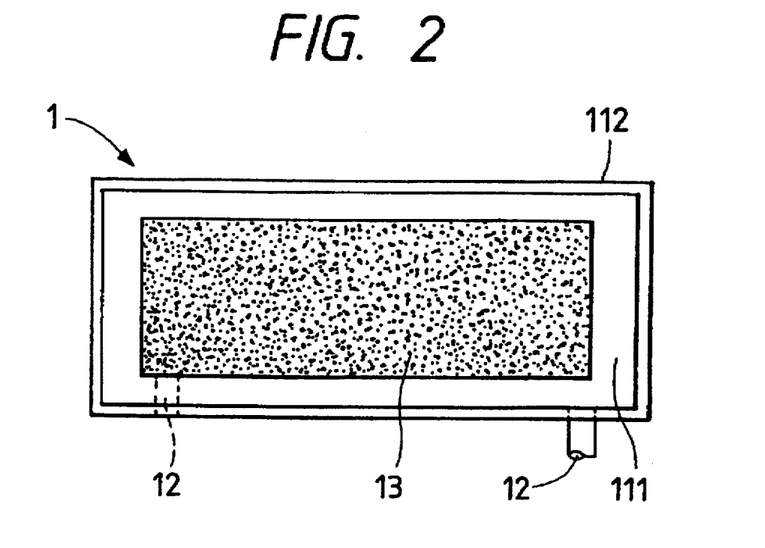
FIG. 2 is a plan view of FIG. 1.
Figure 3:
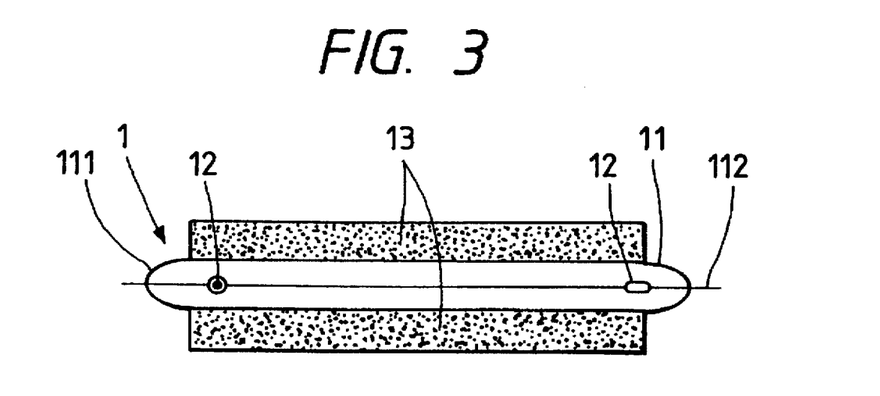
FIG. 3 is a side elevational view of a first alteration of the first embodiment of the fastening pad in accordance with the present invention.
Figure 4:
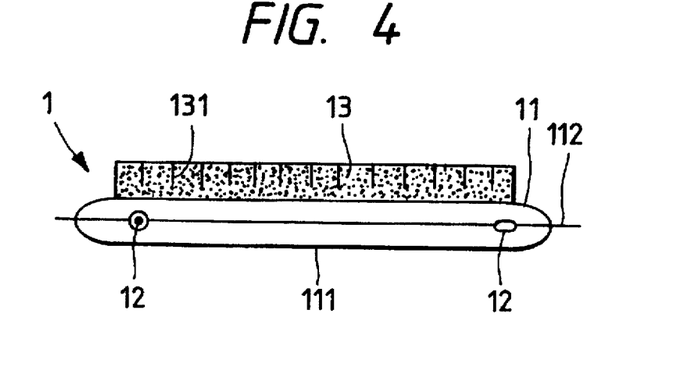
FIG. 4 is a side elevational view similar to FIG. 3, illustrating a second alteration of the first embodiment.
Figure 5:
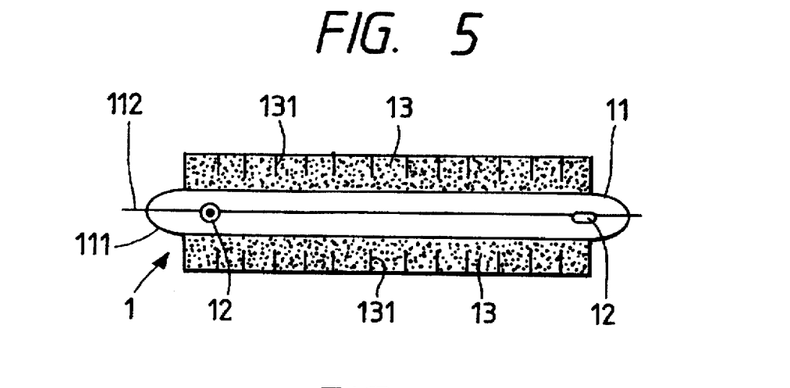
FIG. 5 is a side elevational view similar to FIG. 3, illustrating a third alteration of the first embodiment.
Figure 6:
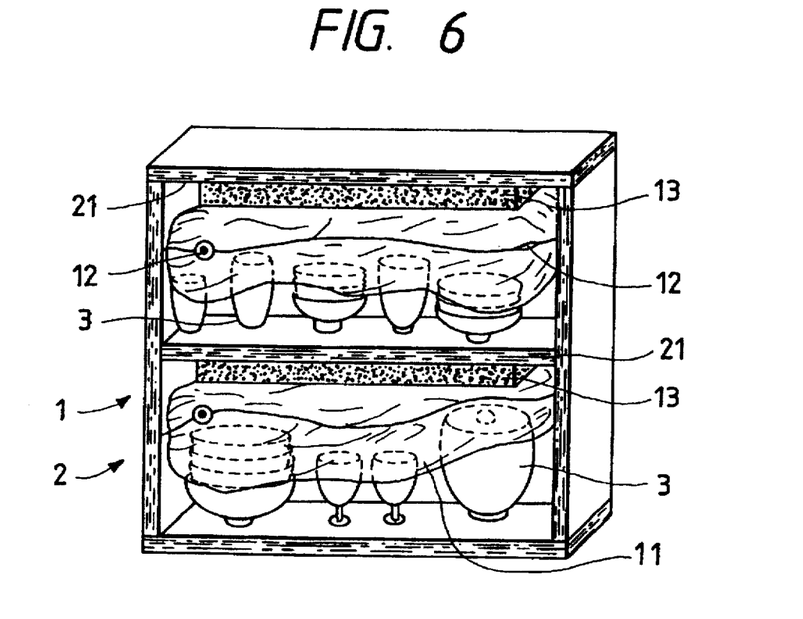
FIG. 6 is a perspective view illustrating an example showing the fastening pad in use of the first embodiment.
Figure 7:
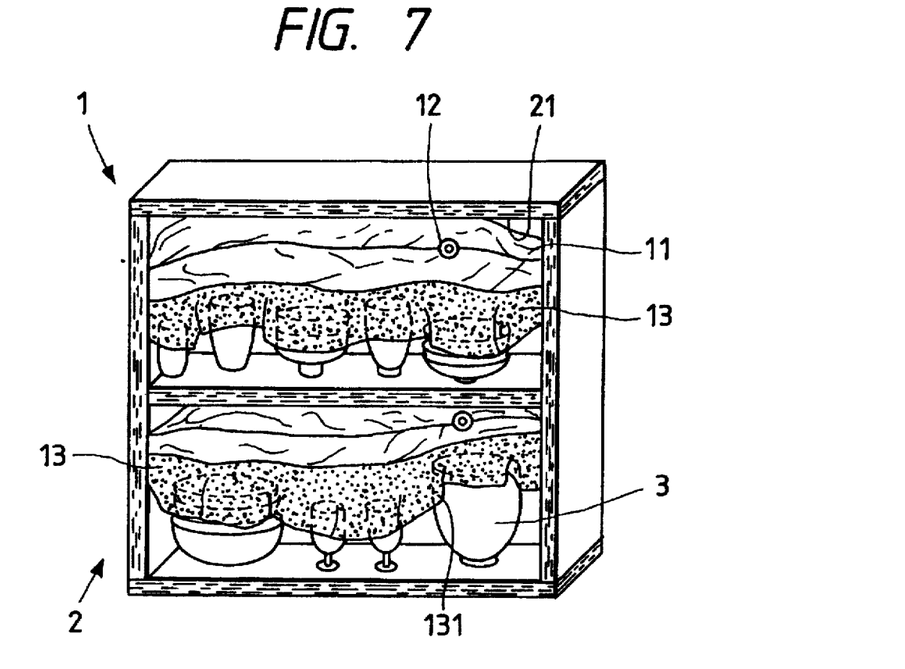
FIG. 7 is a perspective view illustrating an example showing the fastening pad in use in the second alteration of the first embodiment of the fastening pad.

FIGS. 1 and 2 show the basic structure of a first embodiment of a fastening pad 1, FIGS. 3 to 5 show alterations of the first embodiment in use, FIG. 6 shows an example of the first embodiment in use, and FIG. 7 shows an example of the alteration of the first embodiment in use.

A fastening pad 1 in the first embodiment, as shown in FIGS. 1 and 2, comprises a flat sealed bag 11 made of a flexible synthetic resin film 111, at least one vent valve 12 secured to the sealed bag 11, and a flat absorbing member 13 attached to one side of the sealed bag 11 and made of a flexible recoverable foamed material. The sealed bag 11 may be formed by joining peripheral edges 112 of tow sheets of the films 111.

The sealed bag 11 is expanded to temporarily secure stored goods 3 in an accommodating furniture 2 when air is supplied to the sealed bag 11 through vent valve 12.

In this embodiment, the vent valve 12 is a check valve which is capable of exhausting. This check valve enables one to use a tube for adjusting air to be filled in the sealed body 11 and the amount thereof. Although a single vent valve 12 will effect sufficient exhaustion, an additional vent valve, when provided will work for a rapid exhaustion.

The width and length of the sealed bag 11 are set to be about 1.57 times of those of the accommodating furniture such as a cupboard in consideration of shortening of the sealed bag 11 upon expansion. It is desirable to set a size of the sealed bag so as to cover the board in the furniture upon supplying air in the sealed bag. Accordingly, a size of the absorbing member 13 attached to a side of the sealed bag 11 may be equal to or slightly smaller than an inner size of the board on which the goods are stored.

Upon using the fastening pad of this embodiment, as shown in FIG. 6, the fastening pad 1 is inserted into a space between a ceiling board 21 of the accommodating furniture 2 and the stored goods 3 on a floor board 21 of the furniture 2 with the absorbing member 13 above. Then air is supplied through the vent valve 12 into the sealed bag 11. A filling volume of air will be preferable to compress the absorbing member 13 into a half of its thickness under a non-compressed condition. Thus, since the fastening pad of the present invention can absorb and supplement increase and decrease of a volume caused by expansion and contraction due to a temperature change, the stored goods fastened in the furniture by the pad are not subjected to any affection by rollings or vibrations during transportation. Accordingly, there is no possibility of breaking the furniture due to expansion of the pad and breaking the stored goods due to contraction of the pad.

Although the fastening pad 13 is inserted into the furniture 2 with the absorbing member 13 above in this embodiment, the absorbing member 13 may be inserted with the absorbing member 13 below when heights of the stored goods are different.

FIG. 3 shows a first alteration of the first embodiment. In this alteration, the absorbing members 13 are attached to the both sides of the sealed bag 11. This alteration is more effective when it is used between the stored goods or it is disposed on the goods with projections.

FIG. 4 shows a second alteration in which the absorbing member 13 of the first embodiment shown in FIG. 1 is provided on the exterior with slits 131 which are spaced laterally at a given distance. FIG. 5 shows a third alteration in which the absorbing member 13 of the first alteration shown in FIG. 3 is provided on the exterior with the slits 131.

In the case of providing the absorbing member 13 with no slit 131, the exterior of the absorbing member 13 will be deformed warily on the face. Valleys of the waves will reach the stored goods 3, thereby causing uneven pushing force in the pad. However, as shown in FIG. 7, the absorbing member 13 with the slits 131 can absorb irregular heights of the stored goods 3.

Preferably, a depth of the slit 131 is at about a half of the thickness of the absorbing member 13.

Since the filling pressure of air is usually at 0.2 kgf/cm$^2$ (g), it is difficult to adjust the pressure even by a pressure gauge. In particular any worker cannot adjust it. According to the fastening pad of the present invention, it is possible for unskilled workers to set the filling pressure when they are instructed that the absorbing member should be compressed into a half of its thickness even if the sealed bag is expanded or contracted by the change of temperature. Confirmation by sight is made possible.

[Second Embodiment]

Figure 8:
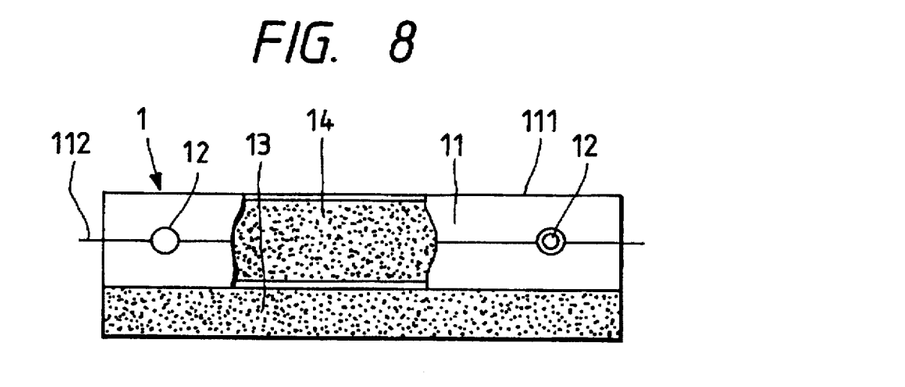
FIG. 8 is a partially-broken side elevational view of a second embodiment of a fastening pad in accordance with the present invention.
Figure 9:
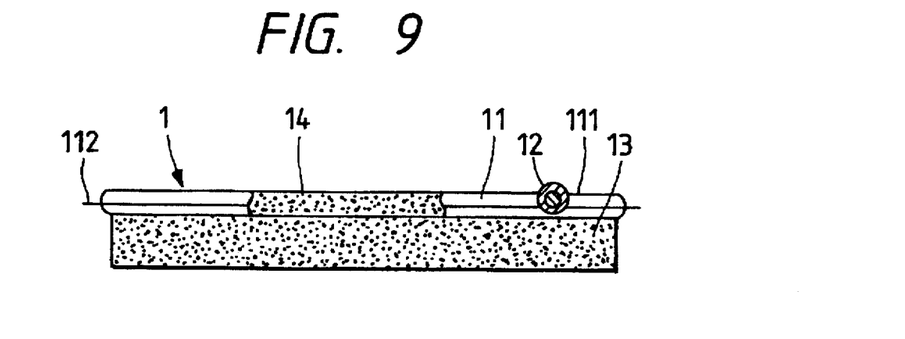
FIG. 9 is a partially-broken side elevational view of the fastening pad shown in FIG. 8, illustrating the pad under contraction.
Figure 10:
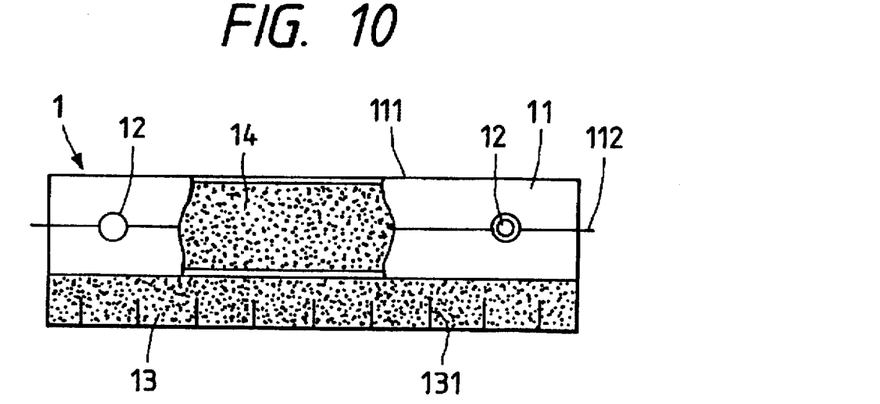
FIG. 10 is a side elevational view similar to FIG. 8, illustrating a first alteration of the second embodiment.
Figure 11:
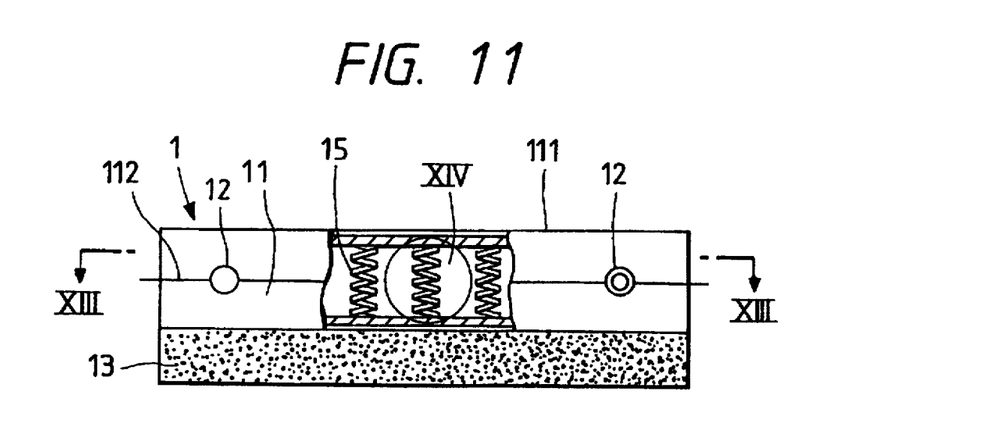
FIG. 11 is a partially-broken side elevational view of a second alteration of the second embodiment of the fastening pad in accordance with the present invention.
Figure 12:
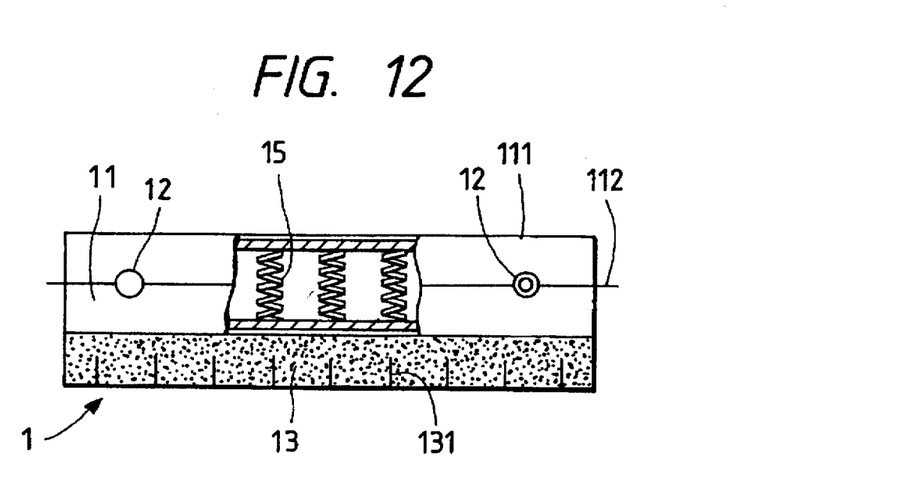
FIG. 12 is a side elevational view similar to FIG. 11, illustrating a third alteration of the second embodiment.
Figure 13:
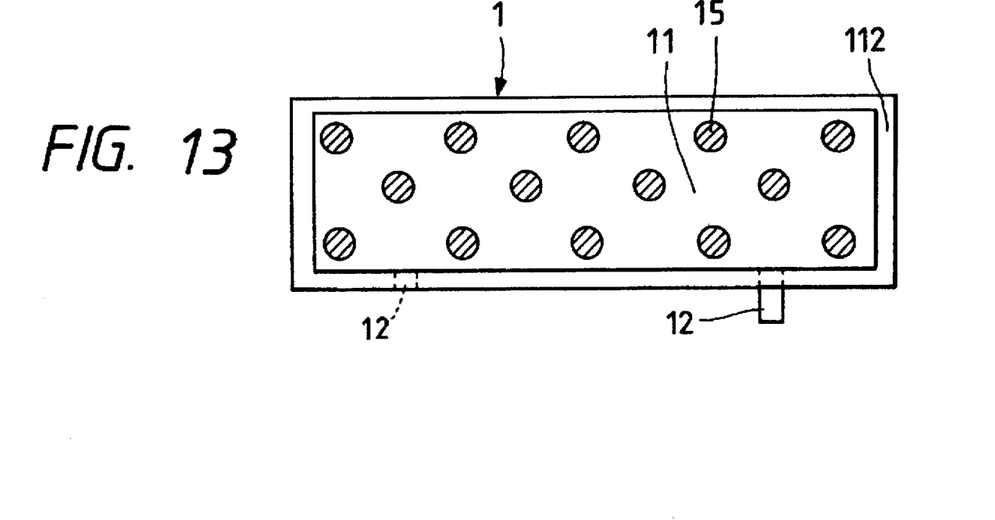
FIG. 13 is a longitudinal sectional view taken along line XIII—XIII in FIG. 11.
Figure 14:
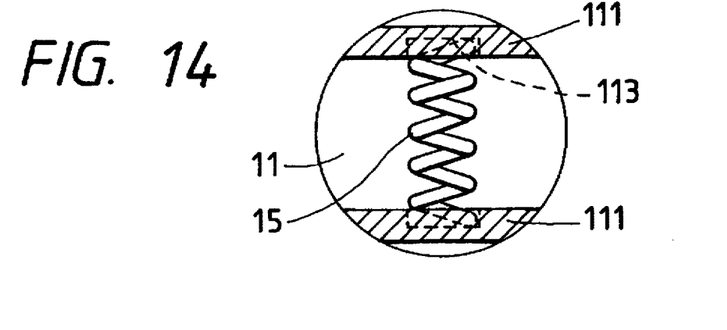
FIG. 14 is a fragmentary partially enlarged sectional view of the circle XIV in FIG. 11.

FIGS. 8 and 9 show the basic structure of a second embodiment of a fastening pad 1, FIG. 10 show a first alteration of the second embodiment, FIGS. 11, 13 and 14 show a second alteration of the second embodiment, and FIG. 12 shows a third alteration of the second embodiment.

The fastening pad 1 of the second embodiment, as shown in FIGS. 8 and 9, an expansible filling member 14 is packed in the sealed bag 11 under a vacuum condition and air is sucked in the sealed bag 11 when the vent valve 12 is opened in use. The other structures of the second embodiment are the same as those of the first embodiment.

The filling member 14 in the second embodiment shown in FIGS. 8 and 9 is made of an expansible porous material while the filling member 14 in the alteration shown in FIGS. 11 to 14 is made by a plurality of compression springs 15 which are disposed in parallel with each other in the sealed bag 11. Preferably, the compression spring 15 is a coil spring or a leaf spring. When the compression spring is used, it is possible to achieve a strong and quick recovery force.

When compression spring 15 is used as the filling member 14, the film 111 may be provided with spring seats 113 for preventing the respective compression springs 15 from being shifted.

Also, in order to provide changes on the deformed face of the absorbing member 13 upon compression, the absorbing member 13 may be provided on the exterior with the slits spaced away laterally by a given distance as shown in FIGS. 10 and 12 in the same manner as the alterations of the first embodiment.

When the fastening pad 1 of the second embodiment is used, first, the sealed bag 11 is compressed by an external force or air in the bag 11 is exhausted by a vacuum pump, as shown in FIG. 9 to block the vent. Second, the fastening pad 1 is inserted between the ceiling board 21 and the stored goods 3 with the absorbing member 13 below. Third, the vent valve 12 is opened. Then, the sealed bag 11 returns to its original shape by the recovery action of the filling member 14 while drawing air into the sealed bag 11 through the vent valve 12 (FIG. 8). As described above in connection with FIGS. 6 and 7, the sealed bag 11 pushes down the absorbing member 13 simultaneously with filling of air to fasten the goods to the furniture with no clearance.

[Third Embodiment]

Figure 15:
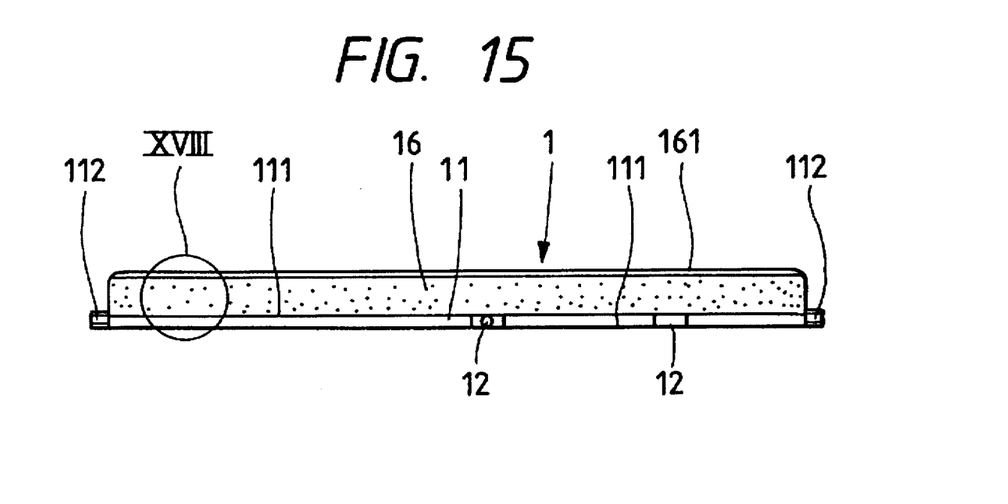
FIG. 15 is a longitudinal sectional view of a third embodiment of a fastening pad in accordance with the present invention.
Figure 16:
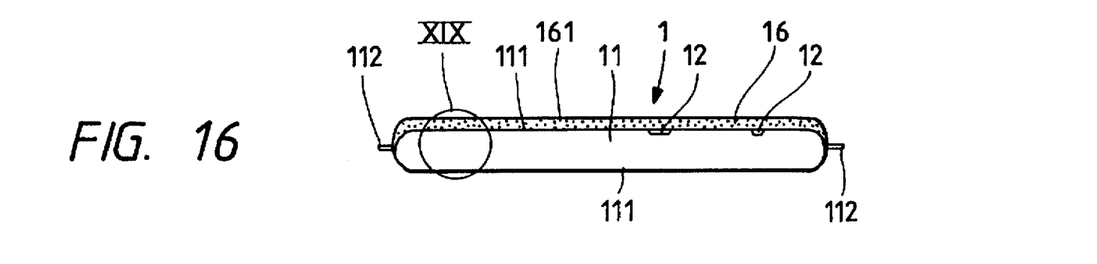
FIG. 16 is a longitudinal sectional view of the fastening pad shown in FIG. 15 under contraction.
Figure 17:
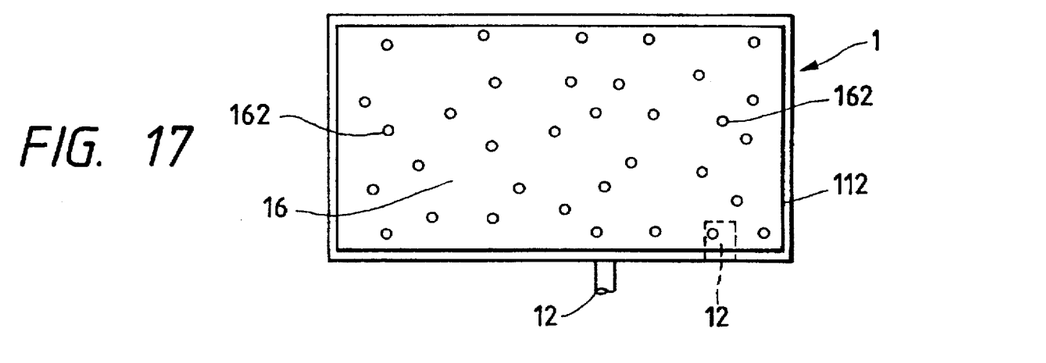
FIG. 17 is a plan view of FIG. 15.
Figure 18:
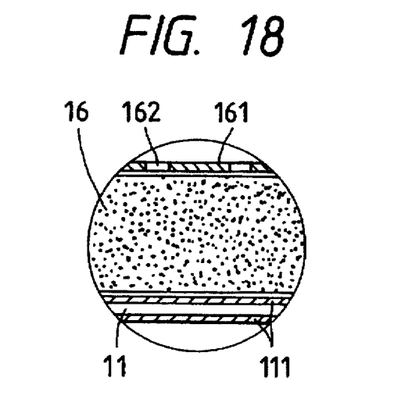
FIG. 18 is a fragmentary enlarged view of the circle XVIII in FIG. 15.
Figure 19:
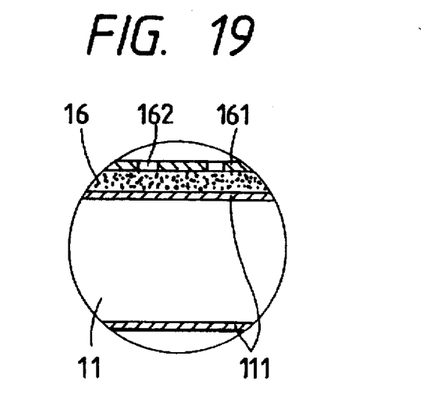
FIG. 19 is a fragmentary enlarged view of the circle XIX in FIG. 16.

FIGS. 15, 17 and 18 show the basic structure of a third embodiment of a fastening pad 1 and FIGS. 16 and 19 shows a state of the third embodiment in use.

The fastening pad 1 of the third embodiment, as shown in FIGS. 15, 17 and 18, an absorbing member 16 is covered with a flexible sheet 161 having a plurality on air vents 162.

The absorbing member 16 may be provided on the outer face with a plurality of slits 131 which are spaced away by a given distance in a longitudinal direction, although the slits 131 are not shown in FIG. 15.

The other structures of the third embodiment are the same as those of the first embodiment.

Although a material of the sheet 161 is not limited, it is preferable that the sheet 161 is made of a material which will not be stretched by an expansion pressure and which can be adhered to the synthetic resin film 111 by heating, for example, synthetic resin film, laminated fiber product, non-woven cloth, or the like.

FIGS. 15 and 18 illustrate a state prior to use of the fastening pad 1 of this embodiment. The absorbing member 16 presents a usual configuration. FIGS. 16 and 19 illustrate a state in which air is filled in the sealed bag 11, air in an air chamber enclosing the absorbing member 16 is exhausted through the air vents 162 and the absorbing member is compressed into a half in its thickness as shown in the normal condition. As air is supplied to the sealed bag 11 through the vent valve 12 for filling, the air in the air chamber is exhausted through the air vents 162 and the film 111 presses the air chamber with a predetermined volume to compress the absorbing member 16.

It is important to compress the absorbing member 16 into a half of thickness under a usual state. This makes it possible to absorb and supplement the increase and decrease of air volume caused by the expansion and contraction due to the change of temperature. Consequently, the stored goods secured to the furniture are not subjected to any effect due to rollings or vibrations. There is no trouble of breaking the furniture due to the expansion and breaking the stored goods due to the contraction.

Figure 20:
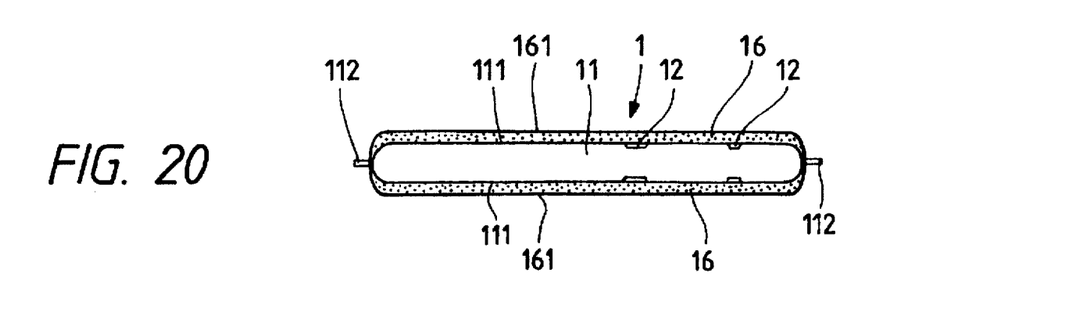
FIG. 20 is a longitudinal sectional view of a first alteration of the third embodiment.

FIG. 20 shows a first alteration of the third embodiment. In the first alteration, the absorbing member 16 is mounted on upper and lower side faces of the sealed bag 11. The other structures of the first alteration are the same as those of the third embodiment.

What is claimed is:

1. A fastening pad which is detachably inserted into an accommodating furniture to temporarily secure stored goods in the furniture as they are, comprising:

a flat sealed bag made of a flexible synthetic resin film;

at least one vent valve secured to said sealed bag; and a flat absorbing member attached to one side of said sealed bag and made of a flexible recoverable foamed material;

wherein said sealed bag is expanded to temporarily secure the stored goods in the accommodating furniture when air is supplied to said sealed bag through said vent valve.

2. A fastening pad according to claim 1, wherein said absorbing member is attached on the both sides of said sealed bag.

3. A fastening pad according to claim 2, wherein an expandable filling member is packed in said sealed bag under a vacuum condition, and wherein air is sucked in said sealed bag when said vent valve is opened in use.

4. A fastening pad according to claim 3, wherein said filled member is made of an expandable porous material.

5. A fastening pad according to claim 3, wherein said filling member comprises a plurality of compression springs which are disposed in paralled with each other in said sealed bag.

6. A fastening pad according to claim 3, wherein said absorbing member is provided on an outer face with a plurality of slits which are spaced by a given distance in a longitudinal direction.

7. A fastening pad according to claim 2, wherein said absorbing member is provided on an outer face with a plurality of slits which are spaced by a given distance in a longitudinal direction.

8. A fastening pad according to claim 2, wherein said absorbing member is covered with a flexible sheet having a plurality of air vents.

9. A fastening pad according to claim 8, wherein said absorbing member is provided on an outer face with a plurality of slits which are spaced by a given distance in a longitudinal direction.

10. A fastening pad according to claim 1, wherein said absorbing member is provided on an outer face with a plurality of slits which are spaced by a given distance in a longitudinal direction.

11. A fastening pad according to claim 1, wherein an expandable filling member is packed in said sealed bag under a vacuum condition, and wherein air is sucked in said sealed bag when said vent valve is opened in use.

12. A fastening pad according to claim 11, wherein said filling member is made of an expandable porus material.

13. A fastening pad according to claim 11, wherein said filling member comprises a plurality of compression springs which are disposed in parallel with each other in said sealed bag.

14. A fastening pad according to claim 11, wherein said absorbing member is provided on an outer face with a plurality of slits which are spaced by a given distance in a longitudinal direction.

15. A fastening pad according to claim 1, wherein said absorbing member is covered with a flexible sheet having a plurality of air vents.

16. A fastening pad according to claim 15, wherein said absorbing member is provided on an outer face with a plurality of slits which are spaced by a given distance in a longitudinal direction.

17. A fastening pad according to claim 15, wherein said absorbing member is attached on the both sides of said sealed bag.

* * * * *